United States Patent [19]
Castro

[11] 3,972,672
[45] Aug. 3, 1976

[54] MACHINE FOR FLATTENING DOUGH BUNS AND THE LIKE

[75] Inventor: Alberto Flores Castro, Coahuila, Mexico

[73] Assignee: Thomas C. Luke, Denver, Colo.

[22] Filed: Nov. 21, 1974

[21] Appl. No.: 526,041

[52] U.S. Cl. .............................. 425/367; 99/353; 100/153; 425/335; 425/373
[51] Int. Cl.² ....................... A23P 1/00; A47J 44/00
[58] Field of Search ............. 99/423, 353, 358, 386, 99/427, 443, 484, 646; 34/113; 100/151, 153–154, 118; 425/335, 367, 373

[56] References Cited
UNITED STATES PATENTS

| | | | |
|---|---|---|---|
| 2,532,080 | 11/1950 | Benbow | 425/373 |
| 2,960,044 | 11/1960 | Anetsberger | 425/367 |
| 3,267,877 | 8/1966 | Thiele et al. | 99/373 |
| 3,291,036 | 12/1966 | Perl | 99/358 |
| 3,299,837 | 1/1967 | Lind | 425/335 |
| 3,429,348 | 2/1969 | Hirtensteiner | 100/153 X |
| 3,459,123 | 8/1969 | Begiebing | 100/118 |
| 3,499,957 | 3/1970 | Ancker | 425/335 X |
| 3,663,340 | 5/1972 | Ross | 100/153 X |

FOREIGN PATENTS OR APPLICATIONS

| | | | |
|---|---|---|---|
| 764,518 | 3/1934 | France | 99/423 |

*Primary Examiner*—Peter Feldman
*Assistant Examiner*—Arthur O. Henderson
*Attorney, Agent, or Firm*—Horace B. Van Valkenburgh; Frank C. Lowe

[57] ABSTRACT

A band passes around two spaced parallel pulleys but behind a drum between the pulleys to flatten dough buns which are placed on the central drum. The central drum is raised or bulging at the center, while thin transverse cross bars are mounted on the drum. The tension of the band may be achieved through adjustment of bearings for the upper pulley, while a motor and speed reducer may be connected to the lower pulley.

6 Claims, 4 Drawing Figures

U.S. Patent  Aug. 3, 1976  3,972,672
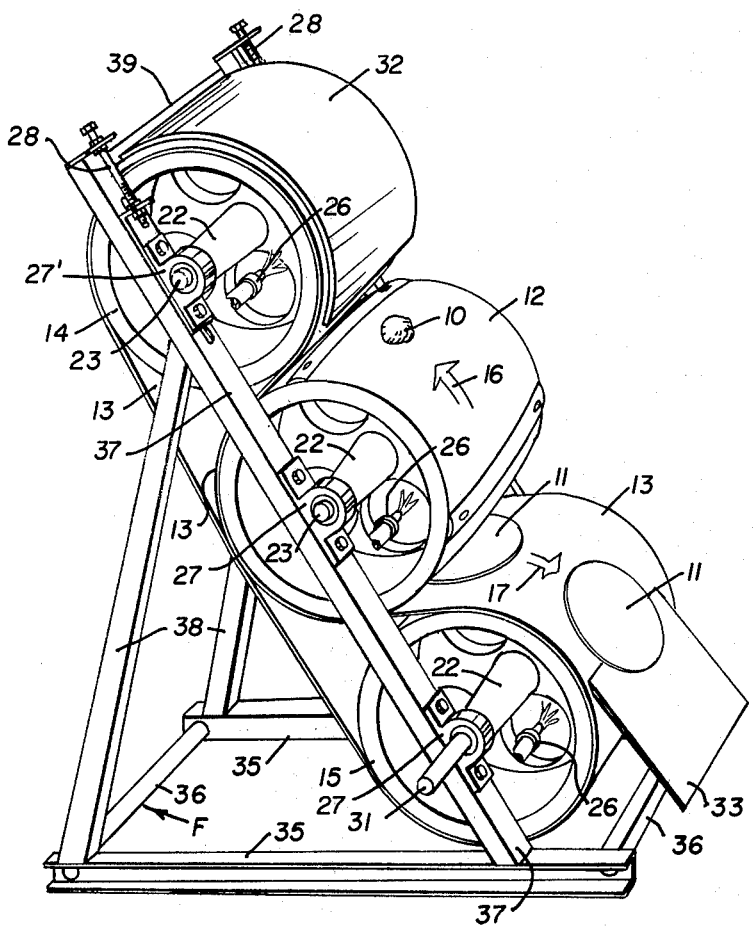
Fig_1
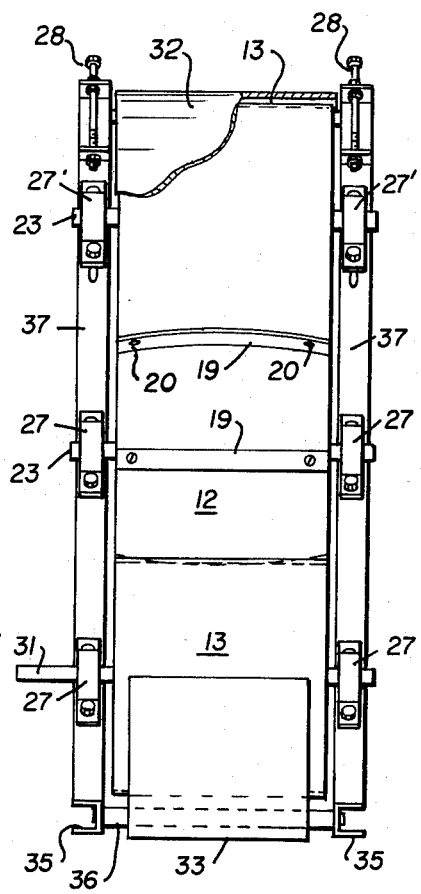
Fig_2
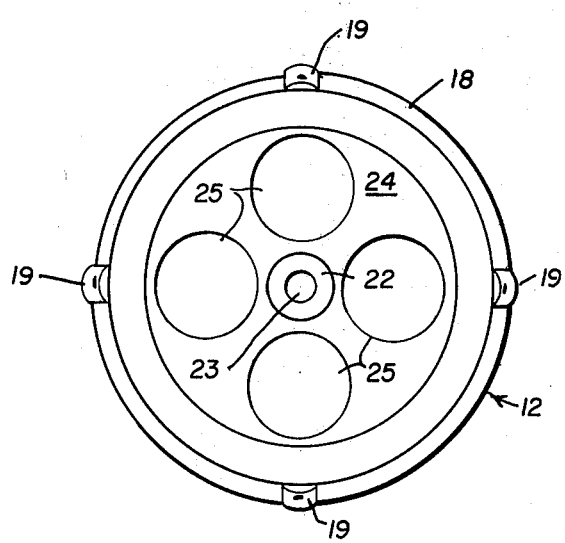
Fig_3
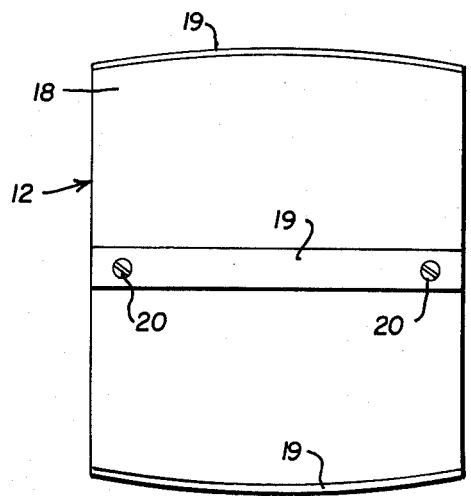
Fig_4

MACHINE FOR FLATTENING DOUGH BUNS AND THE LIKE

This invention relates to an automatic machine used primarily to flatten dough buns of wheat flour to produce flat, circular tortillas or the like. The machine may be used for producing many other types of product which may be flattened by pressure.

One type of prior machine for flattening dough buns utilizes rollers of small diameter, but the tortilla does not come out round and therefore has to be shaped by hand. Other machines are, in effect, a hot plate press but are of low capacity, since they utilize the dead center of an eccentric or axial crank shaft.

The objects of this invention are to provide a machine which avoids the disadvantages of the prior machines, so that the present machine is easier to operate, is simpler in construction, is more compact and also has a higher production rate.

In order to achieve these purposes, a band is associated with at least three pulleys, the band passing behind the central pulley or drum, so as to flatten dough buns which are placed on the central drum. The band also extends around an upper pulley and a lower pulley, with the upper pulley conveniently having adjustable bearings for obtaining the desired tension on the band and the lower pulley conveniently having a shaft extension by which the rollers may be driven.

Additional features and other objects of the invention will become apparent from the description which follows, taken in connection with the accompanying drawings, in which:

FIG. 1 is a perspective view of a machine constructed in accordance with this invention.

FIG. 2 is a front elevation of the machine of FIG. 1.

FIG. 3 is an end view, on an enlarged scale, of the central pulley or drum of FIG. 1.

FIG. 4 is a side view of the pulley or drum of FIG. 3.

A machine constructed in accordance with this invention is adapted to flatten a dough bun 10 to produce a flattened, round disc 11, such as a tortilla. The apparatus is mounted on a framework F and includes a central pulley or drum 12, around the rear of which passes a continuous band 13, as of steel, with the band 13 also passing around an upper or tension pulley 14 and a lower or drive pulley 15. When the central drum 12 is moving in the direction of arrow 16 of FIG. 1 and the band 13 is moving in the direction of arrow 17, a dough bun 10 placed on the drum will be compressed between the band 13 and the rear side of the drum, being flattened and also pressed out to an essentially round condition to produce the flattened, disc-shaped article 11, such as a tortilla.

The central drum 12 has, as in FIG. 4, a transversely arcuate or laterally rounded, convex surface 18, together with a series of transverse bars 19 which are attached to the rim of the drum by screws 20, as in FIG. 4. The convex surface 18 and the bars 19 of the central drum assist in forming the tortilla to the desired round shape and substantially uniform thickness. The pulleys 14 and 15 need not have the convex surface 18 or bars 19, since it is only the central drum against which the dough buns 10 are pressed by the strip 13. The convex surface 18 of the central drum 12 provides more pressure at the center of the dough bun than at the sides. This compensates for the resistance encountered by the dough in extending between the band and the drum. The thin bars 19 also contribute to lowering the pressure of the band over the drum at the opposite ends of the tortilla, producing in that direction somewhat the same effect as the transverse convex shape of the drum. Thus, a substantially uniform thickness over the entire tortilla 11 can be obtained.

Each pulley may be similar in many respects to the drum 12, as illustrated in FIG. 3, in having a hub 22 which fits onto a shaft or axle 23 and an end wall 24 which connects the hub to the rim of the drum or pulley. The end wall 24 is provided with apertures 25 for the escape of hot gases produced by a burner 26 which extends into the area between the hub and the rim and heats the drum and pulleys so as to provide a heated surface on which the dough bun 10 is placed, as well as heating the band 13.

The shaft 23 of drum 12 and pulley 15 is mounted in bearings 27 attached to the frame, while the upper bearings 27' for pulley 14 are slidably mounted on the frame. The latter permits adjustment by conventional bearing adjusting devices 28, in order to adjust the tension of the band 13 about the various rollers, particularly the central drum.

A shaft extension 31 of the lower pulley is adapted to be connected to a drive motor (not shown) or other similar device for rotating the lower drum or roller, although any of the drum or pulley shafts may be connected to a prime mover. An arcuate safety plate 32 extends over the top of pulley 14 and toward the central drum 12, preferably leaving only sufficient space to permit the dough bun 10 to pass thereunder. The purpose of the safety plate 32 is to minimize the possibility of an operator having a finger or hand caught between the strip 13 and the central drum 12. At the lower end of the frame, a discharge plate 33, conveniently attached to the frame, is so positioned that the tortilla 11 carried by the strip 13 will pass around lower pulley 15 but will slide down the discharge plate.

The frame F has base bars 35 and 36, as well as upwardly and rearwardly inclined arms 37 and supports 38 for the arms. The upper ends of arms 37 are connected together by a top strap or bar 39, while the bearings 27 and 27', as well as adjusting devices 28, are mounted on the arms 37.

The heating by gas burners 26, for which other heating systems, such as electrical, may be substituted, is adjusted to maintain the band 13, as well as the drum 12, at a desired temperature, depending upon the humidity and the amount of shortening in the dough. Thus, the tortilla should not shrink as it comes out of the machine; also, it should not stick to the band but should be separated easily by the discharge plate 33. From the plate 33, the tortillas may be unloaded onto a grille or a conveyor, in order to continue cooking.

As will be evident, the feeding of the dough buns onto the central or flattening drum 12 may be done by hand or may be accomplished automatically, using a feed conveyor belt or the like. The use of an automatic device for feeding the dough buns onto the central drum 12 further reduces the possibility of accident to the operator, as the buns 10 are placed on the central drum. It will also be evident that the machine may be made to produce multiple sets of tortillas from dough buns through making both the frame and the pulleys wider, so as to provide a sufficient width to accommodate two or more dough buns on the central drum. Or, the axles 23 may be made long enough for each to receive two or more pulleys, each set with its own steel band.

Although a preferred embodiment of this invention has been illustrated and described and alternative embodiments referred to, it will be evident that various changes may be made in such embodiments, all without departing from the spirit and scope of this invention.

What is claimed is:

1. A machine for flattening dough buns and the like comprising:
    at least two parallel pulleys and a central drum between said pulleys;
    a smooth, imperforate band extending around said pulleys but behind said central drum, said drum having a laterally rounded, convex surface; and
    means for rotating said pulleys and drum to cause each of said pulleys to rotate in the same direction and said drum in the opposite direction, whereby a bun of dough or the like placed on said drum will be flattened by passage between said band and said drum.

2. A machine as defined in claim 1, including:
    adjustment means for one of said pulleys, to adjust the tension of said band.

3. A machine as defined in claim 1, wherein:
    said drum is provided with transverse bars at spaced positions.

4. A machine as defined in claim 3, wherein:
    said bars are rounded on the outer side.

5. A machine as defined in claim 1, including a framework comprising:
    a base;
    upwardly slanted arms connected to said base and provided with bearings for shafts of said drum, and said pulleys;
    means for adjusting the position of said bearings for one of said pulleys; and
    means for driving the other of said pulleys.

6. A machine as defined in claim 1, including: means for supporting one of said pulleys above said drum and the other of said pulleys below said drum; a deflector plate for engaging the underside of a flattened dough bun as it is moved on said band around said lower pulley; and a protective plate extending around the upper pulley in spaced relation thereto and to a point adjacent said drum.

* * * * *